US012789771B2

(12) United States Patent
Klingemann et al.

(10) Patent No.: US 12,789,771 B2
(45) Date of Patent: Nov. 10, 2026

(54) METHOD FOR ADAPTING A BRAKING DECELERATION FOR A MOTOR VEHICLE

(71) Applicant: Volkswagen Aktiengesellschaft, Wolfsburg (DE)

(72) Inventors: Timo Klingemann, Wolfsburg (DE); Stefan Milch, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 19/332,568

(22) Filed: Sep. 18, 2025

(65) Prior Publication Data

US 2026/0077748 A1 Mar. 19, 2026

(30) Foreign Application Priority Data

Sep. 18, 2024 (DE) ..................... 10 2024 208 949.4

(51) Int. Cl.

*B60T 8/174* (2006.01)
*B60T 7/22* (2006.01)
(Continued)

(52) U.S. Cl.

CPC ................ *B60T 8/174* (2013.01); *B60T 7/22* (2013.01); *B60T 8/171* (2013.01); *B60T 8/172* (2013.01);
(Continued)

(58) Field of Classification Search

CPC . B60T 8/174; B60T 7/22; B60T 8/171; B60T 8/172; B60T 8/58; B60T 2201/022;
(Continued)

(56) References Cited

U.S. PATENT DOCUMENTS 9,840,242 B2 12/2017 Bretzigheimer et al.
11,407,408 B2 8/2022 Barth et al.
(Continued)

FOREIGN PATENT DOCUMENTS

DE 102005002760 A1 8/2005
DE 102005054754 A1 5/2007
(Continued)

*Primary Examiner* — Yi-Kai Wang
(74) *Attorney, Agent, or Firm* — Muncy, Geissler, Olds & Lowe, P.C.

(57) ABSTRACT

A method for adapting a braking deceleration for a vehicle comprising a system for avoiding collisions, including an associated traffic sensor system and a force sensor system. An optimal braking deceleration is ascertained for the evasive maneuver. A current driving velocity of the motor vehicle is ascertained, and a value of a transverse acceleration of the motor vehicle is ascertained via the force sensor system. A setpoint value of a transverse acceleration-dependent braking deceleration is determined based on the value of the transverse acceleration. A velocity-dependent braking deceleration is determined based on the driving velocity. The optimal braking deceleration is ascertained based on the setpoint value of the transverse acceleration-dependent braking deceleration and the setpoint value of the velocity dependent braking deceleration such that the optimal braking deceleration has, as a mathematical function of the variables driving velocity and transverse acceleration, an opposite monotonicity with respect to these variables.

10 Claims, 2 Drawing Sheets

(51) Int. Cl.

| | |
|---|---|
| ***B60T 8/171*** | (2006.01) |
| ***B60T 8/172*** | (2006.01) |
| ***B60T 8/58*** | (2006.01) |

(52) U.S. Cl.
CPC ........... *B60T 8/58* (2013.01); *B60T 2201/022* (2013.01); *B60T 2210/12* (2013.01); *B60T 2210/32* (2013.01); *B60T 2250/00* (2013.01); *B60T 2250/04* (2013.01)

(58) Field of Classification Search
CPC ............. B60T 2210/12; B60T 2210/32; B60T 2250/00; B60T 2250/04; B60T 8/17558; B60W 2520/10; B60W 2520/125; B60W 2720/106; B60W 30/0953
USPC ............................................................ 701/70
See application file for complete search history.

(56) References Cited

U.S. PATENT DOCUMENTS

| | | | | |
|---|---|---|---|---|
| 2004/0155811 | A1* | 8/2004 | Albero .................. | B60W 30/16 342/72 |
| 2020/0086856 | A1* | 3/2020 | Park ...................... | B60W 30/09 |
| 2021/0291818 | A1* | 9/2021 | Barth ................ | B60W 30/0956 |

FOREIGN PATENT DOCUMENTS

| | | | |
|---|---|---|---|
| DE | 102008005305 | A1 | 7/2009 |
| DE | 102008005310 | A1 | 7/2009 |
| DE | 102009020649 | A1 | 11/2010 |
| DE | 102013008073 | A1 | 11/2014 |
| DE | 102013225970 | A1 | 6/2015 |
| DE | 102015205673 | A1 | 10/2016 |
| DE | 102016011282 | A1 | 3/2018 |

* cited by examiner

METHOD FOR ADAPTING A BRAKING DECELERATION FOR A MOTOR VEHICLE

This nonprovisional application claims priority under 35 U.S.C. § 119 (a) to German Patent Application No. 10 2024 208 949.4, which was filed in Germany on Sep. 18, 2024, and which is herein incorporated by reference.

BACKGROUND OF THE INVENTION

Field of the Invention

The invention relates to a method for adapting a braking deceleration for a motor vehicle, the motor vehicle comprising an emergency system for avoiding collisions, including an associated traffic sensor system for capturing a traffic situation and a force sensor system for capturing forces acting in each case upon the motor vehicle and/or upon individual axles and/or wheels, an evasive maneuver being initiated in response to critical driving situation captured by the emergency system, and an optimal braking deceleration being ascertained for the evasive maneuver.

Description of the Background Art

Individual driving functions in motor vehicles are being increasingly controlled automatically, in particular in the case of clearly definable functions in delimitable, recurring traffic situations. Driver assistance systems also exist, which support a driver only in perceiving and evaluating a traffic situation, in that, under a certain condition or with a certain driving behavior, an acoustic warning signal or haptic feedback (via the steering wheel, for example as a vibration) is output to the driver (when approaching an edge line in the case of a lane departure warning system). However, individual driving functions may also be controlled directly by an automatic system if this is permitted by the driving function to be controlled (for example, in an adaptive cruise control system or an adaptive speed regulation system), or if required by the complexity and/or level of danger of the traffic situations (for example, due to a short remaining response time).

A system of this type for directly controlling individual driving functions usually captures surroundings and, for example, a surrounding traffic situation of a motor vehicle by means of usually optical sensors, which may possibly be based on different physical principles. A decision is made about an activation of the provided driving function based on an analysis of the generated image data, which preferably include an object recognition.

An assisted or automated control of this type is also known, for example, for avoiding collisions in emergencies. In a system of this type, a critical traffic situation, in which a collision is imminent unless there is a change in the driving behavior, is detected via a traffic sensor system, which has the aforementioned sensors, among other things, and a driving maneuver for avoiding the imminent collision is automatically activated. A driving maneuver of this type may include a strong braking or in an avoidance movement, depending on the specific traffic situation, i.e., in particular depending on the time remaining to the collision as well as on possible further road users, who are to be taken into account in planning the driving maneuver.

This area of tension between evasive maneuvers and a pure braking operation as well as possible solution approaches thereto are known from DE 10 2015 205 673 A1 and DE 10 2008 005 305 A1.

SUMMARY OF THE INVENTION

It is therefore an object of the present invention to improve the aforementioned solution approaches and, for example, to provide a method for adapting a braking deceleration for a motor vehicle, which permits optimal transverse dynamics with regard to a potential evasive maneuver.

The aforementioned object is achieved, in an example, according to the invention by a method for adapting a braking deceleration for a motor vehicle, the motor vehicle comprising an emergency system for avoiding collisions, including an associated traffic sensor system for capturing a traffic situation and a force sensor system for capturing forces acting in each case upon the motor vehicle and/or upon individual axles and/or wheels, an evasive maneuver being initiated in response to a critical driving situation captured by the emergency system, and an optimal braking deceleration being ascertained for the evasive maneuver, and a current driving velocity of the motor vehicle being ascertained, and a value of a transverse acceleration of the motor vehicle being ascertained with the aid of the force sensor system.

A setpoint value of a transverse acceleration-dependent braking deceleration can be determined on the basis of the value of the transverse acceleration, and a setpoint value of a velocity-dependent braking deceleration is determined on the basis of the driving velocity, the optimal braking deceleration being ascertained on the basis of the setpoint value of the transverse acceleration-dependent braking deceleration and the setpoint value of the velocity-dependent braking deceleration in such a way that the optimal braking deceleration has, as a mathematical function of the variables driving velocity and transverse acceleration, an opposite monotonicity with regard to these variables.

A motor vehicle includes, for example, any vehicle having an internal combustion engine in the drive train and/or an electric drive (i.e., also a vehicle having a hybrid drive), any of the usual vehicle sizes being able to be present a priori, i.e., in particular a passenger car or a truck.

An emergency system for avoiding collisions includes, for example, a system which is designed and configured to capture a traffic situation with the aid of the traffic sensor system and to evaluate the traffic situation with regard to a critical driving situation with the aid of a control unit, which includes, for example, corresponding computer components, such as a CPU, and a random-access memory addressable by the CPU.

The traffic sensor system preferably comprises a number of sensors, which are configured to capture the traffic situation surrounding the motor vehicle and are configured, for example, to capture and recognize a road alignment and other vehicles as well as any other road users (such as pedestrians or cyclists) and other obstacles on the roadway and preferably in the immediate surroundings thereof. The number of sensors preferably comprises in each case at least one optical sensor and particularly preferably in each case multiple optical sensors oriented in the direction of travel of the motor vehicle and in the direction of the region behind the motor vehicle. These optical sensors particularly preferably each comprise at least one camera and/or a radar device and/or a lidar device. The traffic sensor system also comprises, for example, an evaluation unit for capturing the traffic situation, which is configured to evaluate the image data generated by the optical sensors for the aforementioned road alignment and other vehicles, etc., preferably with the aid of image recognition. The correspondingly evaluated image data are then evaluated by the control unit in the aforementioned manner with regard to a critical driving situation, in particular also driving data of other vehicles (such as velocity and possibly acceleration in each case) also being determined from the temporal profile of the evaluated image data.

A critical driving situation includes, for example, a level of danger of an imminent collision in the present traffic situation. The collision is considered to be imminent, for example, if it will occur with a sufficient amount of certainty (for example, 95% or 99% confidence) unless there is a change in the driving behavior (i.e., traffic lane as well as velocity and possibly acceleration) of the motor vehicle or the driving behavior of another vehicle, and if the time remaining to the collision has dropped below a limit value under these circumstances (i.e., unchanged driving behavior of all parties involved). A limit value of this type may be selected, for example, from an interval of 1 s to 5 s. In connection with the critical driving situation, an evasive maneuver comprises, for example, a driving maneuver, which includes a lane and/or direction change of the motor vehicle, and which is configured to avoid the imminent collision or at least to significantly reduce its probability (for example, by at least 50% or at least 75%) if the driving behavior of other road users otherwise remains the same.

The current driving velocity and a value of a transverse acceleration of the motor vehicle are now ascertained. The current driving velocity of the motor vehicle can be ascertained, for example, by the usual measures of tachometry during normal vehicle operation. The transverse acceleration may be other than zero, on the one hand due to a driving movement carried out by the driver of the motor vehicle him/herself (in particular, in response to the critical driving situation), or on the other hand also as a result of a cornering movement (which may be constituted, for example, by the avoidance movement itself). The force sensor system may measure the transverse acceleration, in particular on the basis of one or multiple acceleration sensors.

A setpoint value of a transverse acceleration-dependent braking deceleration can now be determined on the basis of the ascertained value of the transverse acceleration of the motor vehicle, and a setpoint value of a velocity-dependent braking deceleration is determined on the basis of the driving velocity (also referred to below only as “velocity”) of the motor vehicle. The transverse acceleration-dependent braking deceleration is, for example, a braking deceleration in the direction of travel (i.e., a negative acceleration in the “longitudinal direction”), which is ascertained as a function of the transverse acceleration. The transverse acceleration-dependent braking deceleration represents, for example, the physical driving relationships between the longitudinal and transverse deceleration and their effects on the transverse dynamics. An attempt can be made to keep the vectorial sum of lateral cornering force and braking force as constant as possible when determining the setpoint value of the transverse acceleration-dependent braking deceleration.

The following may also apply to the velocity-dependent braking deceleration: more transverse offset may be built up at a high driving velocity than at a low driving velocity, using the same steering angle (steering angle gradient) within a certain maneuvering time constituted by the time remaining to the collision. If the transverse dynamics are now limited, for example, via a steering angle gradient, the potential to build up transverse offset is greater at a high driving velocity than at a low driving velocity. This may now be used to determine the setpoint value of the velocity-dependent braking deceleration in that the loss of transverse dynamics resulting from a stronger braking and the resulting lower transverse acceleration remains limited at higher velocities.

The optimal braking deceleration is then ascertained, taking into account this relationship on the basis of the setpoint value of the transverse acceleration-dependent braking deceleration and the setpoint value of the velocity-dependent braking deceleration, preferably as a mathematical function of this transverse acceleration- and velocity-dependent braking deceleration, and thus also as a mathematical function of the variables transverse acceleration and velocity on which they are each based. The relationship described here between these two variables and their individual influence (ceteris paribus) on the particular setpoint values of the braking decelerations is taken into account in that the optimal braking deceleration has, as a mathematical function of the variables driving velocity and transverse acceleration, an opposite monotonicity with respect to these variables.

The monotonicity of a function can be understood here and in the following to be the information as to whether a function has a monotonously increasing or monotonously decreasing profile for a growth or increase of a certain variable (i.e., itself increases or at least remains the same or decreases or at least remains the same).

A rapid braking, and thus a high value of a braking deceleration, is sensible in critical driving situations. For the aforementioned reasons of transverse dynamics, it may be advantageous to not maximize the braking deceleration in the longitudinal direction, for example, for an evasive maneuver, since the sum of the braking and transverse forces transferred from a tire to the roadway, for example, is limited by the slip and is thus finite. However, a sufficiently high transverse offset may be built up to avoid a collision on a case by case basis, even with a lower transverse acceleration, particularly at high driving velocities.

The procedure specified by the invention takes this into account and expresses it in a mathematical relationship between the behavior of the optimal braking deceleration and the characteristic driving variables transverse acceleration and velocity.

The optimal braking deceleration is advantageously ascertained in such a way that it is at a maximum for a minimum absolute value of the transverse acceleration-dependent braking deceleration and/or at a minimum for a maximum absolute value of the transverse acceleration-dependent braking deceleration. The minimum absolute value of the transverse acceleration-dependent braking deceleration may be predefined, for example, by a maximum value of the transverse acceleration which may still be taken up by the motor vehicle before a drift occurs. The maximum absolute value may be constituted, for example, by the maximum absolute value of the longitudinal deceleration (in the absence of a transverse acceleration) which may still be taken up by the motor vehicle. The aforementioned example reflects the desired monotonicity of the optimal braking deceleration with regard to the transverse acceleration with a suitable selection of the velocity-dependent braking deceleration.

The optimal braking deceleration is advantageously ascertained as a convex function of the transverse acceleration-dependent braking deceleration and/or as a concave function of the velocity-dependent braking deceleration. This means, for example, that the optimal braking deceleration, interpreted as a function of only the variables of transverse acceleration-dependent braking deceleration (i.e., for example, for a fixed value of the velocity-dependent braking deceleration) is a convex function. A convex function f(x) is understood to be that x1<x2 is true for two variable values:

$$f(t\cdot x1+(1-t)\cdot x2)\leq t\cdot f(x1)+(1-t)\cdot f(x2) \quad \text{(i)}$$

Equation (i) similarly applies to concave functions having a reverse inequality sign (≥).

The optimal braking deceleration is preferably ascertained on the basis of a weighted mean value, and/or a p-norm, and/or an extreme value formation, into which at least the setpoint values of the transverse acceleration-dependent braking deceleration and the velocity-dependent braking deceleration are incorporated. An extreme value formation includes the formation of a maximum and the formation of a minimum (from a plurality of arguments in each case). The p-norm||x||p for a vector x having n elements (vector entries) xj is defined as:

$$\|x\|_p := \left(\sum_{j=1}^{n} |x_n|^p\right)^{1/p},$$

the maximum norm resulting as a special case for p approaching ∞, i.e., the formation of the maximum from the vector entries xj. The formation of a maximum or minimum is computationally easy to effectuate; the use of other p-norms permit a fine tuning, which may make it possible to map relationships between the individual variables even more precisely.

The proposed procedure comprises, for example, the fact that optimal braking deceleration axres may be ascertained as the following for the setpoint value of transverse acceleration-dependent braking deceleration axy and the setpoint value of velocity-dependent braking deceleration av:

$$axres = \max(f(av), axy), \quad \text{(ii)}$$

f (av) preferably being a monotonously increasing function of av.

It has proven to be advantageous if transverse acceleration-dependent braking deceleration axy is formed on the basis of negative square $ay^2$ of transverse acceleration ay and on the basis of an initial value aymax (aymax<0) having, for example, a maximum absolute value, i.e.:

$$axy = ay\max + ky\cdot ay^2 \quad \text{(iii)}$$

with a suitable constant ky (to be determined by simulations and/or physical driving tests), aymax being able to be constituted by the maximum absolute value of the longitudinal deceleration (in the absence of a transverse acceleration), which may still be taken up by the motor vehicle (aymax=−|amax|).

Velocity-dependent braking deceleration axv is also particularly preferably formed on the basis of (negative) square $v^2$ of velocity v and on the basis of an initial value avmin (avmin<0) having, for example, a minimum absolute value, i.e., $$axv = av\min - kv\cdot v^2 \quad \text{(iv)}$$

with a suitable constant kv (cf. constant ky).

It has proven to be also advantageous if a distance d to a critical object of the critical driving situation is captured with the aid of the traffic sensor system and a setpoint value of a distance-dependent braking deceleration axd is ascertained on the basis of this distance d, the ascertainment of optimal braking deceleration axres also taking place on the basis of the setpoint of distance-dependent braking deceleration axd, and the optimal braking deceleration having, as a mathematical function of the variable distance d, the same monotonicity as with regard to the variable of transverse acceleration ay (and thus the optimal braking deceleration decreases monotonously as the distance increases). In particular, the absolute value of distance-dependent braking deceleration |axd| may be at maximum for a minimum distance d to the critical object. A critical object includes, for example, the object with which the collision is imminent in the critical driving situation (i.e., for example, another vehicle) and as a result of which the evasive maneuver is initiated, but also another object (vehicle, other road users, boundary/obstacle), with which a collision may possibly occur within the scope of the evasive maneuver.

An object acceleration aob of the or a critical object can be ascertained with the aid of the traffic sensor system, and a setpoint value of an object-dependent braking deceleration axo is ascertained on the basis of object acceleration aob, the ascertainment of optimal braking deceleration axres also taking place on the basis of the setpoint value of optimal braking deceleration aob, and optimal braking deceleration axred has, as a mathematical function of variable object acceleration aob, an opposite monotonicity than with regard to variable transverse acceleration ay. It may be advantageous to take into account an object acceleration of the critical object, in particular in complex and confusing traffic situations. To increase object acceleration aob (i.e., its absolute value), a higher braking deceleration may be sensible on a case by case basis (even if this may impair the transverse dynamics).

A value of a friction (also: friction value) u for the motor vehicle on a road is favorably ascertained with the aid of the force sensor system, and a setpoint value of a friction-dependent acceleration axμ is ascertained on the basis of this value of friction μ, the ascertainment of optimal braking deceleration axres also taking place on the basis of the setpoint value of friction-dependent braking deceleration axμ, and optimal braking deceleration axres having, as a mathematical function of variable friction μ, an opposite monotonicity with regard to the variable transverse acceleration av. To ascertain the value of friction, the force sensor system is configured, for example, to capture forces acting in each case upon individual axles and/or wheels of the motor vehicle, for example with the aid of sensors of the particular slip. The ascertainment of value of friction μ make take place in a manner known per set in the prior art. In particular, friction-dependent braking deceleration axμ may also be zero for a friction value of μ=0, which takes into account the fact that no braking deceleration is possible with a vanishing friction.

It has furthermore been proven to be advantageous if optimal braking deceleration axres is formed on the basis of a maximum formed from the setpoint value of transverse acceleration-dependent braking deceleration axy, the setpoint value of friction-dependent braking deceleration axu, and a further function, which, in turn, is formed on the basis of a minimum formed from the setpoint value of distance-dependent braking deceleration axd, the setpoint value of velocity-dependent braking deceleration axv, and the setpoint value of object-dependent braking deceleration axo, i.e., for example in the following form:

$$axres = \max(\min(axd, axv, axo), ax\mu, axy). \qquad \text{(v)}$$

An example of this type is suitable for achieving the desired monotonicity of the optimal braking deceleration of the fundamental variables, taking into account the described dependencies of the different braking decelerations.

A motor vehicle is also provided, including an emergency system for avoiding collisions, which comprises an associated traffic sensor system for capturing a traffic situation and a force sensor system for capturing forces acting in each case upon the motor vehicle and/or upon individual axles and/or wheels, the emergency system being configured to carry out the method described above. In particular, the emergency system is configured to carry out the calculations occurring in the method by means of a processor and a random-access memory addressable thereby as well as by means of corresponding program commands on the random-access memory or on a non-volatile memory.

The motor vehicle according to the invention shares the benefits of the method according to the invention. The advantages specified for the method and for its refinements may similarly also be transferred to the motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
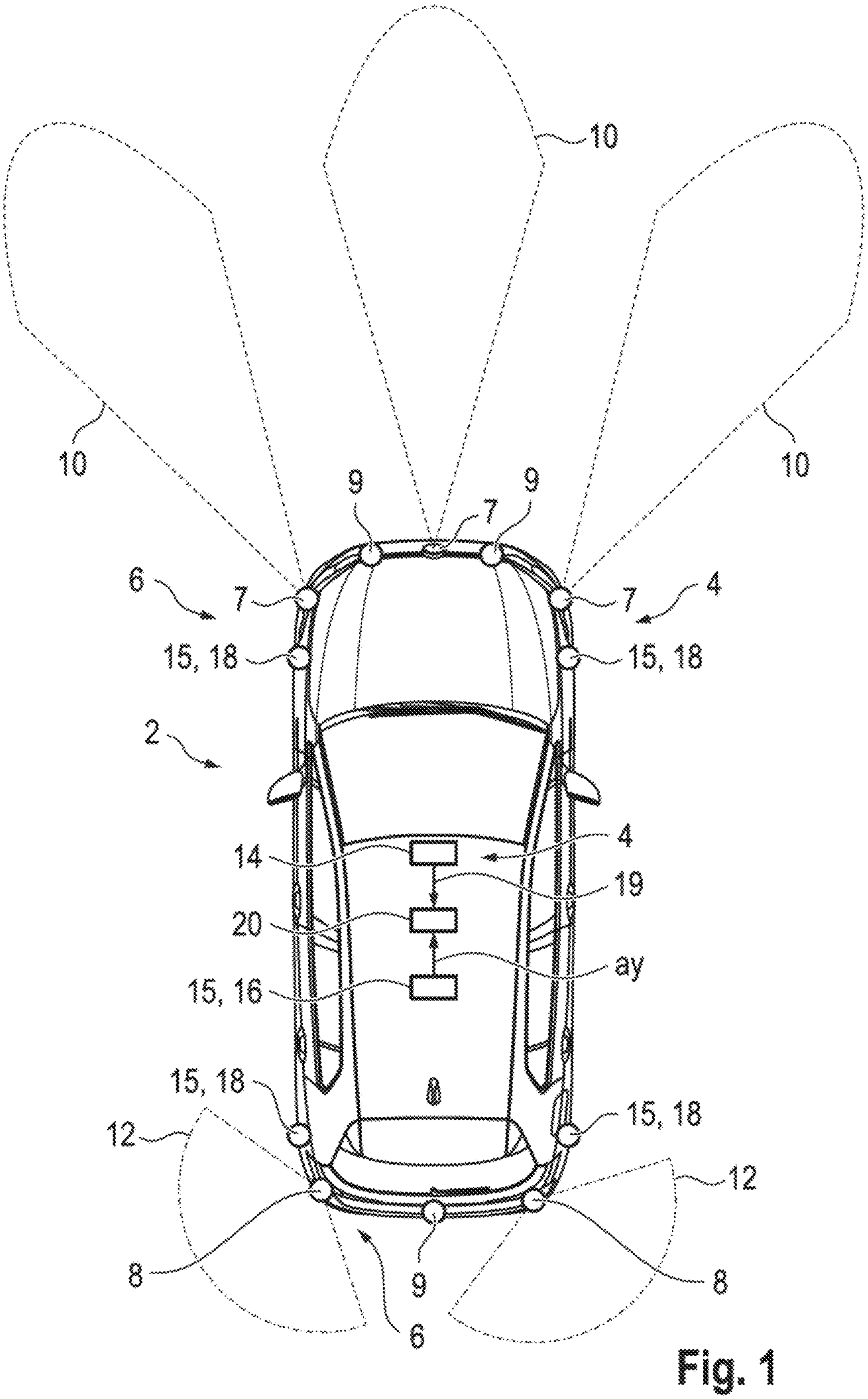
FIG. 1 schematically shows a motor vehicle comprising an emergency system for avoiding collisions.

FIG. 1 schematically shows a motor vehicle 2 comprising an emergency system 4 for avoiding collisions 4. Emergency system 4 comprises a traffic sensor system 6, with the aid of which a traffic situation is captured, in which motor vehicle 2 is situated in each case. Traffic sensor system 6 has a number of front-facing cameras 7 and a number of rear-facing cameras 8. Viewing angles 10, 12 of front-facing cameras 7 and rear-facing cameras 8 are also illustrated schematically in FIG. 1. Traffic sensor system 6 additionally includes further sensors 9 for capturing distances and velocities of objects in the traffic situation, these sensors 9 being able to be constituted, for example, by radar and/or lidar sensors, and the objects being able to be constituted by other vehicles or other road users or also by obstacles or boundaries in the vicinity of a traffic lane.

Individual cameras 7, 8 and sensors 9 of traffic sensor system 6 are connected to an evaluation unit 14, which, on the one hand, specifically recognizes a traffic situation (and thus the associated objects, such as road alignment, vehicles, etc.) in the image data generated by front-facing and rear-facing cameras 7, 8, and, on the other hand, ascertains the velocities and accelerations of other objects, in particular other road users in the traffic situation, on the basis of data generated by sensors 9. Data 19 of the captured traffic situation are forwarded to a control unit 20 of emergency system 4, in which it is recognized whether a critical driving situation is present, i.e., whether, for example, a collision with another vehicle, with another road user, or with a boundary or an obstacle is imminent. If this is the case, control unit 20 automatically initiates an evasive maneuver, for which the driving velocity of motor vehicle 2 is also reduced by an optimal braking deceleration in a manner still to be described.

To carry out this method, emergency system 4 also comprises a force sensor system 15, which has a transverse acceleration sensor 16 as well as further wheel sensors 18. Transverse acceleration sensor 16 is configured to capture a transverse acceleration ay and forward it to the control unit. Wheel sensors 18 are configured to capture, among other things, a velocity v of motor vehicle 2 as well as further forces acting upon the wheels (such as slip and the like), so that control unit 20 may calculate, for example, a friction value from these forces.

Figure 2:
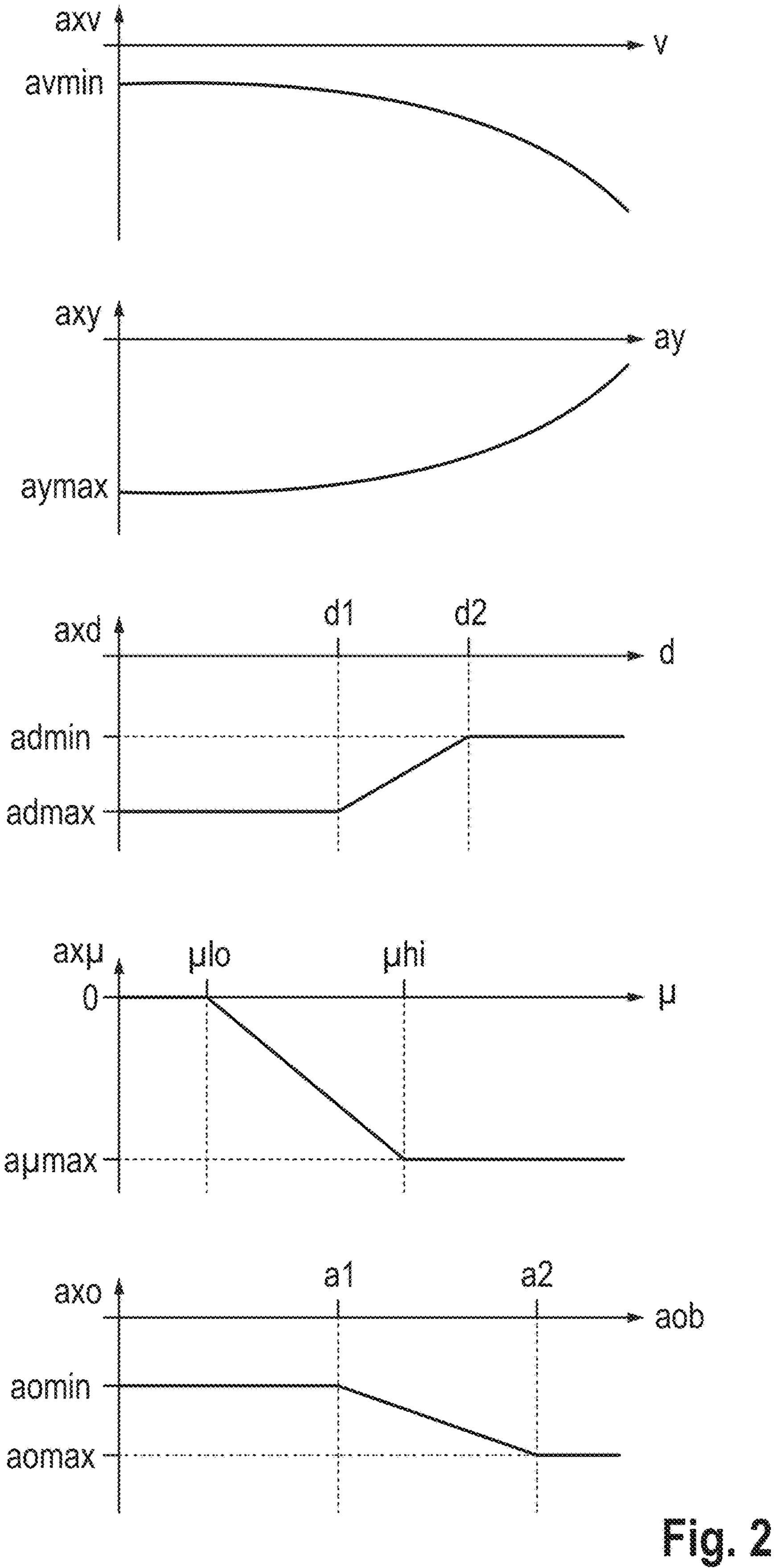
FIG. 2 schematically shows individual braking decelerations dependent on different parameters, which are used in the emergency system according to FIG. 1 for an optimal braking deceleration in an evasive maneuver.

A velocity-dependent braking deceleration axv, a transverse acceleration-dependent braking deceleration axy, a distance-dependent braking deceleration axd, a friction-dependent braking deceleration axu, and an object-dependent braking deceleration axo are each illustrated in a diagram in FIG. 2.

Velocity-dependent braking deceleration axv is illustrated as a function of a velocity v of motor vehicle 2 according to FIG. 1 and, in the present case, has the dependency (see above) defined in equation (iv); its absolute value is thus, for example, strictly monotonously increasing in velocity v. Transverse acceleration-dependent braking deceleration axy is illustrated as a function of transverse acceleration ay and, in the present case, has the dependency (see above) defined in equation (iii); its absolute value is thus strictly monotonously decreasing in transverse acceleration ay. Velocity v and transverse acceleration ay are captured by radar sensors 18 and transverse acceleration sensor 16, respectively, in particular in the manner described above.

Distance-dependent braking deceleration axd is illustrated as a function of a distance d to a critical object, which, in a critical driving situation, may be constituted, for example, by the object with which the collision is imminent, or by a further object with which a collision may also be about to happen, or which is to be taken into account in planning the optimal braking deceleration as a result of its proximity to the trajectory of motor vehicle 2. In the present case, distance-dependent braking deceleration axd is initially constant up to a distance value d1 for a vanishing distance d, starting from an initial value admax having a maximum absolute value of the braking deceleration. Between distance value d1 and a distance value d2>d1, the absolute value of distance-dependent braking deceleration |axd| decreases to a minimum absolute value at admin and is constant for distances d>d2. This profile take into account the circumstance that the selection of the absolute value of the braking deceleration is to be greater a priori the close the proximity to a critical object, although the braking deceleration should not exceed a maximum absolute value (which is defined by admax) for reasons of driving physics.

Friction-dependent braking deceleration axμ is illustrated as a function of friction μ, and its absolute value is monotonously increasing in these variables. In the present case, friction-dependent braking deceleration axμ is also zero for a vanishing friction μ=0 and surroundings u up to a minimum value ulo of the friction, which takes into account the circumstance that no significant braking force may be transferred to the roadway with a vanishing or very low friction. This is possible to a significant degree only starting at minimum value ulo. For friction values μ>μlo, the absolute value of friction-dependent braking deceleration |axμ| increases (linearly in the present case) until friction-dependent braking deceleration axμ reaches and maintains its absolute value maximum at aμmax, starting at an upper limit μhi of friction μ. This absolute value maximum may be defined, for example, by a maximum possible braking force transfer. The forces at the wheels ascertained by wheel sensors 18 of motor vehicle 2, for example, are used to ascertain the specific value of friction μ.

Object-dependent braking deceleration axo is illustrated as a function of an object acceleration aob of this critical object (i.e., for example, another vehicle), which is preferably ascertained by control unit 20 from data 19 of the traffic situation captured by traffic sensor system 6. Object-dependent braking deceleration axo essentially has a profile comparable to distance-dependent braking deceleration axd, but with the opposite monotonicity, which takes into account the circumstance that a critical driving situation becomes "more critical" as distance d of a critical object decreases (i.e., the danger of collision increases), and/or as acceleration aop of the critical object increases.

The optimal braking deceleration may now be ascertained from the variables specified here in the functional dependency already described above, in particular according to equation (v) (the maximum and minimum formations being expandable by suitable p-norms or comparable operations).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for adapting a braking deceleration for a motor vehicle, the motor vehicle comprising an emergency system for avoiding collisions, an associated traffic sensor system for capturing a traffic situation and a force sensor system for capturing forces acting in each case upon the motor vehicle and/or upon individual axles and/or wheels, the method comprising:

initiating an evasive maneuver in response to a critical driving situation captured by the emergency system;

ascertaining an optimal braking deceleration for the evasive maneuver;

ascertaining a current driving velocity of the motor vehicle;

ascertaining a value of a transverse acceleration of the motor vehicle via the force sensor system;

determining a setpoint value of a transverse acceleration-dependent braking deceleration based on of the value of the transverse acceleration;

determining a setpoint value of a velocity-dependent braking deceleration based on the driving velocity; and ascertaining the optimal braking deceleration based on the setpoint value of the transverse acceleration-dependent braking deceleration and the setpoint value of the velocity-dependent braking deceleration such that the optimal braking deceleration has, as a mathematical function of the variables driving velocity and transverse acceleration, an opposite monotonicity with respect to these variables.

2. The method according to claim 1, wherein the optimal braking deceleration is ascertained that it is at a maximum for a minimum absolute value of the transverse acceleration-dependent braking deceleration and/or at a minimum for a maximum absolute value of the transverse acceleration-dependent braking deceleration.

3. The method according to claim 1, wherein the optimal braking deceleration is ascertained as a convex function of the transverse acceleration-dependent braking deceleration and/or as a concave function of the velocity-dependent braking deceleration.

4. The method according to claim 1, wherein the optimal braking deceleration is ascertained based on:

a weighted mean value;

a p-norm; and/or an extreme value formation, into which at least the setpoint values of the transverse acceleration-dependent braking deceleration and the velocity-dependent braking deceleration are incorporated in each case.

5. The method according to claim 1, wherein the transverse acceleration-dependent braking deceleration is formed based on the square of the transverse acceleration and based on an initial value.

6. The method according to claim 1, wherein a distance to a critical object of the critical driving situation is captured with the aid of the traffic sensor system, wherein a setpoint value of a distance-dependent braking deceleration is ascertained on the basis of this distance, wherein the ascertainment of the optimal braking deceleration also takes place based on the setpoint value of the distance-dependent braking deceleration, and wherein the optimal braking deceleration has, as a mathematic function of the variable distance, the same monotonicity as with respect to the variable transverse acceleration.

7. The method according to claim 1, wherein an object acceleration of the or a critical object is ascertained with the aid of the traffic sensor system, wherein a setpoint value of an object-dependent braking deceleration is ascertained based on the object acceleration, wherein the ascertainment of the optimal braking deceleration also takes place on the basis of the setpoint value of the optimal object-dependent braking deceleration, and wherein the optimal braking deceleration has, as a mathematic function of the variable object acceleration, an opposite monotonicity with respect to the variable transverse acceleration.

8. The method according to claim 1, wherein a value of a friction for the motor vehicle on a road is ascertained with the aid of the force sensor system, wherein a setpoint value of a friction-dependent acceleration is ascertained based on the value of friction, wherein the ascertainment of the optimal braking deceleration also takes place based on the setpoint value of the friction-dependent braking deceleration, and wherein the optimal braking deceleration has, as a mathematic function of the variable friction, an opposite monotonicity as with respect to the variable transverse acceleration.

9. The method according to claim 8, wherein the optimal braking deceleration is formed on the basis of a maximum formed from:

the setpoint value of the transverse acceleration-dependent braking deceleration;

the setpoint value of the friction-dependent braking deceleration; and a further function, which, in turn, is formed basis on a minimum formed from the setpoint value of the distance-dependent braking deceleration, the setpoint value of the velocity-dependent braking deceleration, and the setpoint value of the object-dependent braking deceleration.

10. A motor vehicle comprising:

an emergency system to avoid a collision, the emergency system comprising:

an associated traffic sensor system to capture a traffic situation; and a force sensor system to capture forces acting in each case upon the motor vehicle and/or upon individual axles and/or wheels, wherein the emergency system is configured to carry out the method according to claim 1.

* * * * *